US006962348B2

United States Patent
Fink

(12) United States Patent
(10) Patent No.: US 6,962,348 B2
(45) Date of Patent: Nov. 8, 2005

(54) SEALING APPARATUS HAVING A SINGLE GROOVE

(75) Inventor: Steven T. Fink, Mesa, AZ (US)

(73) Assignee: Tokyo Electron Limited, Tokyo (JP)

( * ) Notice: Subject to any disclaimer, the term of this patent is extended or adjusted under 35 U.S.C. 154(b) by 119 days.

(21) Appl. No.: 10/627,599

(22) Filed: Jul. 28, 2003

(65) Prior Publication Data

US 2004/0017049 A1 Jan. 29, 2004

Related U.S. Application Data

(60) Provisional application No. 60/398,729, filed on Jul. 29, 2002.

(51) Int. Cl.[7] ................................................. F16L 17/06
(52) U.S. Cl. ...................... 277/608; 277/614; 277/628; 277/641; 277/910
(58) Field of Search ................................ 277/608, 614, 277/628, 641, 910

(56) References Cited

U.S. PATENT DOCUMENTS 3,831,951 A * 8/1974 Petel et al. .................. 277/641
5,090,871 A * 2/1992 Story et al. ...................... 417/9
5,564,177 A * 10/1996 Fernandes et al. ............. 29/451
5,639,100 A * 6/1997 Garrigues et al. ........... 277/614
6,123,337 A * 9/2000 Fang et al. .................. 277/336

* cited by examiner

Primary Examiner—Enoch Peavey
(74) Attorney, Agent, or Firm—Oblon, Spivak, McClelland, Maier & Neustadt, P.C.

(57) ABSTRACT

A sealing apparatus includes a sealing arrangement and a groove in a base. The sealing arrangement may comprise an o-ring and a grounding gasket where both the o-ring and the grounding gasket partially protrude in a longitudinal direction from the groove. Thus, the grounding gasket, which is equipped with ends that can be pulled out of the groove, can be removed from the groove by a pulling force. This leaves the o-ring accessible for removal or maintenance at a much lower cost in terms of manufacturing and operational costs. The sealing arrangement may also include inner and outer o-rings which seal a fluid flow from the atmosphere.

22 Claims, 7 Drawing Sheets

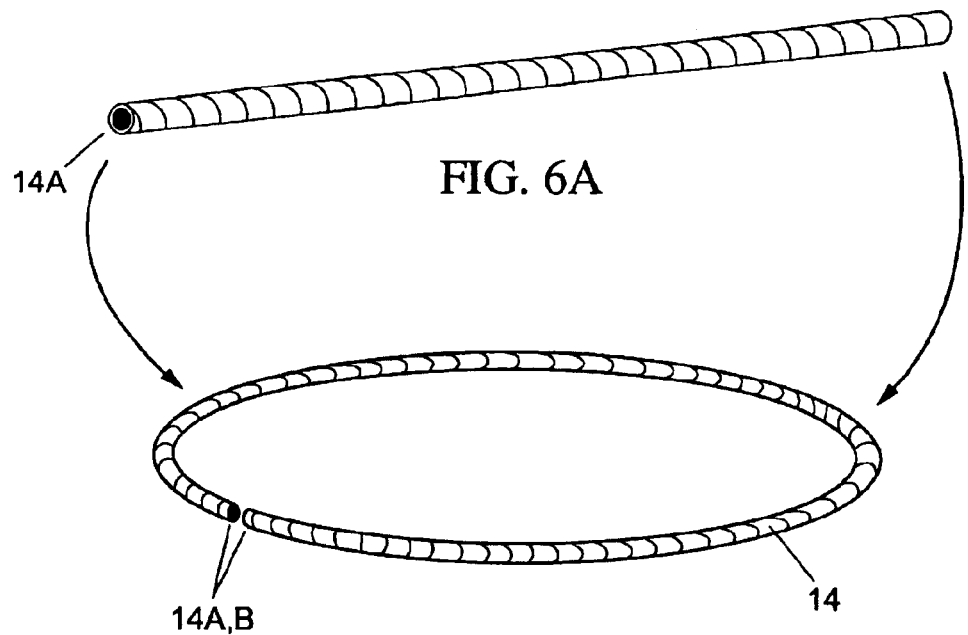
FIG. 6A
FIG. 6B
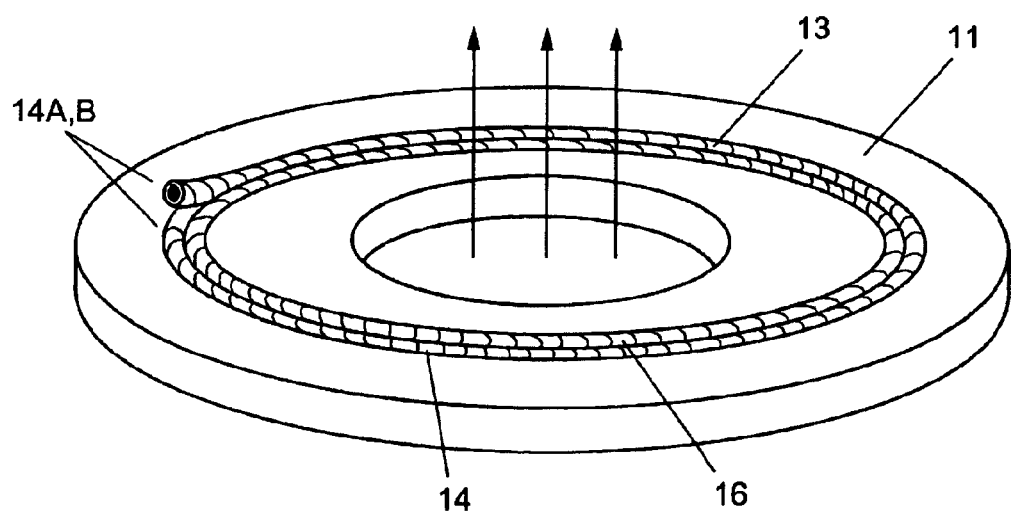
FIG. 7

SEALING APPARATUS HAVING A SINGLE GROOVE

CROSS-REFERENCE TO RELATED APPLICATIONS

This application is related to pending International Application No. PCT/US01/45860, filed on Dec. 19, 2001. This application is related to, and claims priority to, U.S. Provisional Application No. 60/398,729, filed Jul. 29, 2002. The contents of these applications are incorporated herein by reference.

BACKGROUND OF THE INVENTION

1. Field of the Invention

The present invention relates to a sealing apparatus comprising at least one o-ring and a groove capable of retaining the o-ring and secondary sealing rings or grounding gaskets adjacent to the o-ring.

2. Discussion of the Background

In many hardware configurations, maintaining a seal between components is an important design consideration. For example, in plasma processing at low pressure, the connection of various parts to form a vacuum-tight process chamber requires sealing members to maintain the vacuum integrity at these connections.

Typically, a sealing member can comprise a simple o-ring configuration. Generally, where two connecting parts meet, each part is equipped with a surface that cooperates with the surface of the other part in a known way. At least one of these surfaces includes a sealing member. The sealing member typically includes an o-ring, secured within a groove. Where conductive parts are connected, the connection between these parts also requires a grounding gasket to act as a circuit bridge. The grounding gasket also requires a groove.

As illustrated in FIG. 1 for the connection of two cylindrical components, these grooves 5, 3 are substantially circular, centered about a center of the surface, and contained within the surfaces of at least one of the mating parts 1. As shown in FIG. 2, the groove 5 securing the o-ring 6 can comprise a dovetail or a rectangular cross section. As such, the groove 5 will be narrower where the groove is coplanar with the mating surface 1A. Therefore, dovetail grooves have the advantages of being able to secure an o-ring inside, while allowing an upper portion of the o-ring to protrude out of the groove and contact the surface of another mating part and allowing the o-ring to spread out within the groove under compression.

Thus, when the mating parts are brought together, a seal of an interior region between the parts from an exterior region is formed where the o-ring 6 contacts the surfaces of the groove and the second mating part. Where an electrical connection must be maintained between the parts, it is known to use a grounding gasket 4. The grounding gasket 4 contacts both mating parts as the o-ring 6 is compressed, acting as a circuit bridge and electrically coupling both parts. In general, a separate groove 3, 5 is formed for each o-ring 6 and each grounding gasket 4, respectively.

However, the use of known dovetail grooves also usually requires a groove relief in order to be able to extract the o-ring. A groove relief is a discontinuity in the groove at a particular point, and appears wider than the rest of the groove. Without the groove relief 7, removal of the o-ring is more difficult. In fact, the removal of the o-ring 6 from groove 5 without the groove relief 7 can cause damage to the o-ring 6 and/or the groove 5 that may disrupt the vacuum integrity of the mated components.

Moreover, removal of an o-ring in a groove 5 having a groove relief 7 requires that a narrow prying tool be inserted into the groove relief 7. An applied torque then forces a portion of the o-ring 6 out of position. Once a portion of the o-ring 6 is out of position, the remainder can be forcefully pulled out of the groove 5.

Ultimately, repeatedly prying o-rings 6 out of grooves 5 in mating surfaces is a harmful practice since the prying action leads to the wear and tear of the various parts. Additionally, the manufacture of groove reliefs increases labor and machining costs and is not always chosen. For mating surfaces requiring multiple seals and/or mating surfaces requiring seals and additional grooves for grounding gaskets, the need for extra grooves and groove reliefs creates a need for the mating surfaces to be larger, thus leading to increases in materials costs.

SUMMARY OF THE INVENTION

Consequently, there exists a need for a sealing apparatus that reduces machining costs and the sizes of mating surfaces as compared to known systems. According to one embodiment, the present invention includes at least one o-ring and a groove capable of retaining the o-ring and secondary sealing rings or grounding gaskets. This structure decreases machining costs and makes maintenance and manufacture easier.

Therefore, in a preferred embodiment of the invention, a sealing and grounding apparatus comprises an o-ring and a grounding gasket contained within a single groove, disposed within a surface of a first mating part, capable of retaining the o-ring and the grounding gasket without groove reliefs.

Additionally, in a connection of two members having mating surfaces where at least one of the members separates a first region from a second region, a need also exists for a sealing apparatus comprising at least two o-rings and a groove. The groove of the present invention retains the at least two o-rings.

Thus, in a second preferred embodiment of the present invention, a sealing apparatus comprises at least two o-rings and a groove, disposed within a surface of a mating part, wherein the groove can have groove reliefs. The o-rings integrally contact each other and the groove. The o-rings both partially protrude out from the groove and are configured to contact a second mating surface, wherein a leak check port is disposed between the respective o-ring contact points with the second mating surface.

BRIEF DESCRIPTION OF THE DRAWINGS

A more complete appreciation of the invention and many of the attendant advantages thereof will be readily apparent with reference to the following detailed description particularly when considered in connection with the accompanying drawings, in which:

FIG. 6A is a perspective view of an uncurled grounding gasket;

FIG. 6B is a perspective view of the grounding gasket of FIG. 6A once the grounding gasket has been curled;

FIG. 7 is a perspective view of a grounding gasket being removed from the groove prior to removing the adjacent o-ring seal.

DETAILED DESCRIPTION OF THE INVENTION

Figure 1:
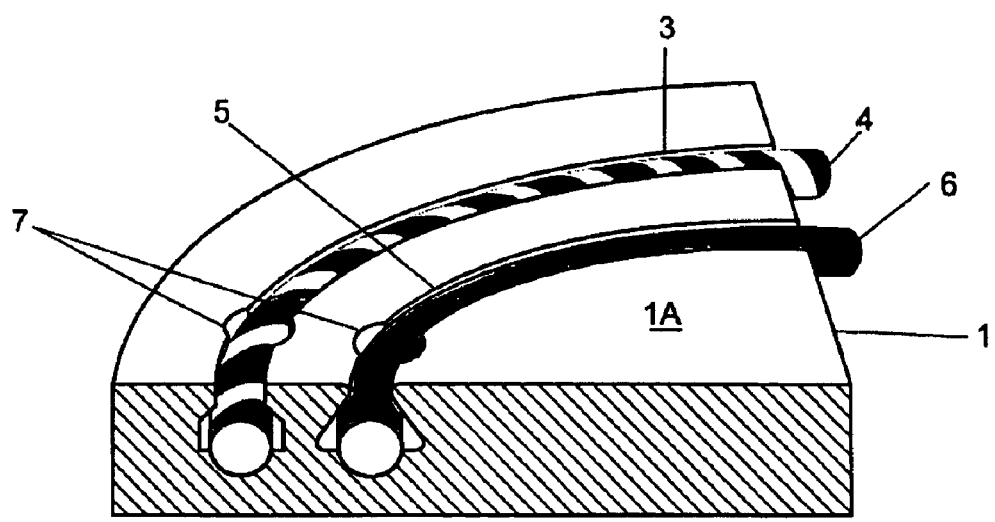
FIG. 1 is a perspective view of the background art.
Figure 2:
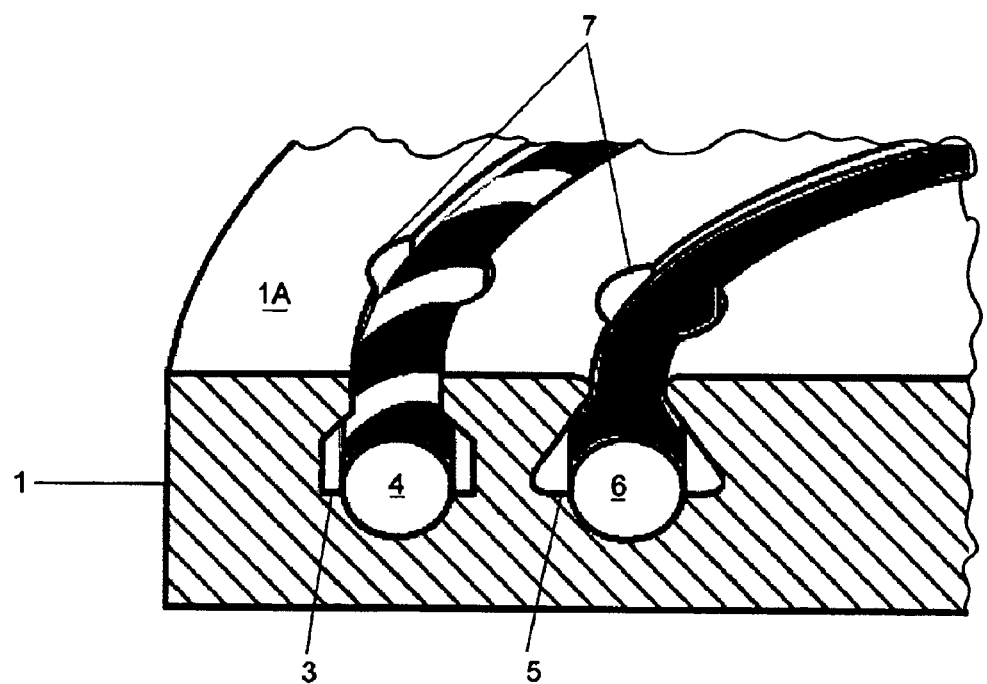
FIG. 2 is an enlarged perspective view of a cutaway in the background art.

Referring now to the drawings, wherein like reference numerals designate identical or corresponding parts throughout the several views, a sealing apparatus includes a single groove formed within a mating surface which contains an o-ring capable of sealing a first area between mating parts from a second area. This groove may additionally contain at least one of: a grounding gasket capable of maintaining a circuit bridge between mating parts, and a second o-ring to create seals that supplement the seals created by the first o-ring.

Figure 3:
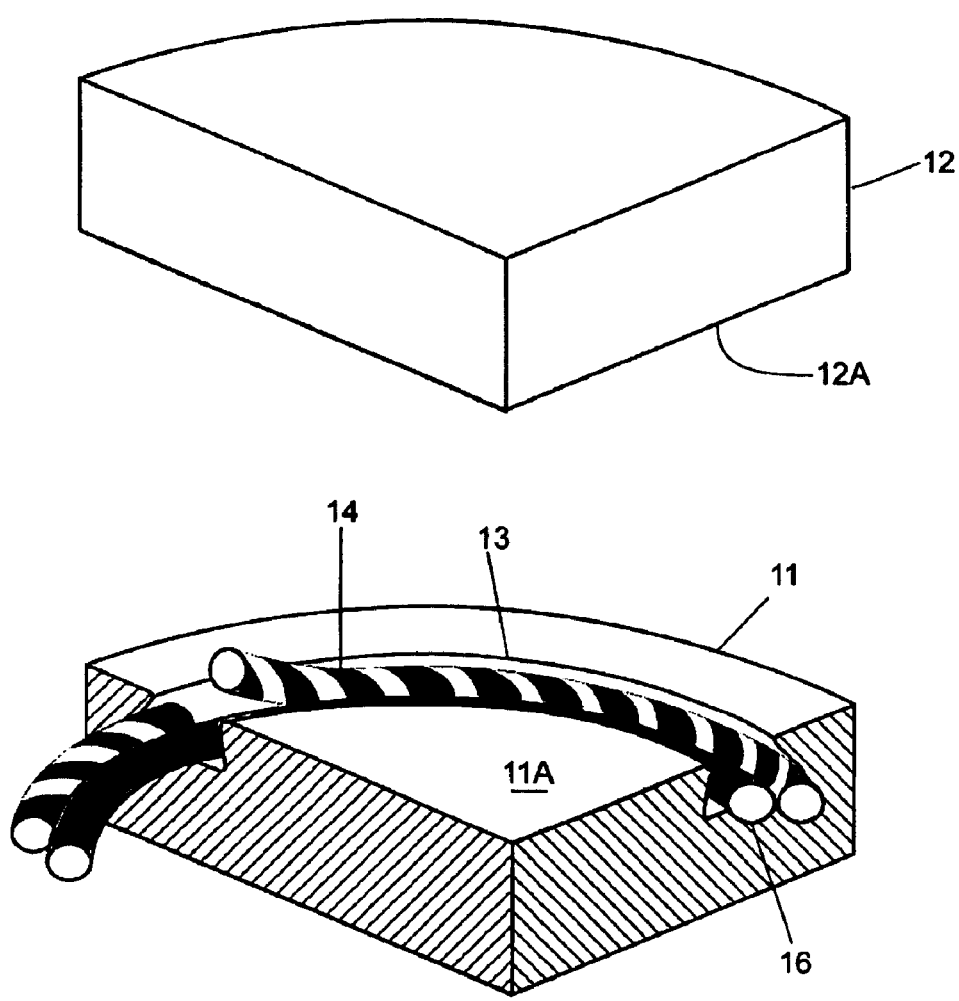
FIG. 3 is a perspective view of a preferred embodiment of the invention.
Figure 4:
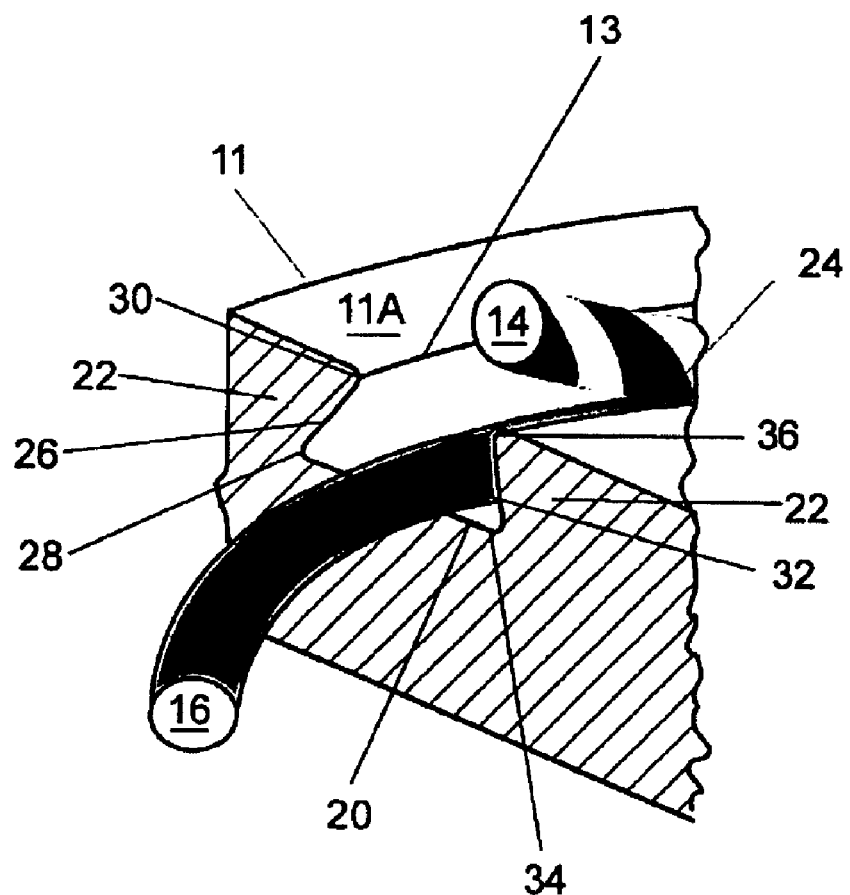
FIG. 4 is an enlarged perspective view of a cutaway of the embodiment of FIG. 3.

Referring to FIG. 3, a first mating part 11 has a surface 11A and mates with a second mating part 12 having a second surface 12A. A groove 13 is formed within the surface 11A of the first mating part 11. As shown in FIG. 4, the groove 13 has a substantially dovetail shaped cross-section. Thus, if the groove 13 were divided in half along the length of the groove 13, each half would have a base 20 and a wing 22, and a groove centerline 24 can be defined. In general, the wing 22 extends from the base 20 of the groove 13 to the surface 11A, and comprises a first wing surface 26 (to the left of centerline 24 in FIGS. 4 and 5) extending between a first inner edge 28 and a first outer edge 30 and a second wing surface 32 (to the right of centerline 24 in FIGS. 4 and 5) extending between a second inner edge 34 and a second outer edge 36. As shown in FIG. 4, the first and second inner edges 28, 34 of each half taper away from each other; i.e. extend a greater distance from centerline 24 than the first and second outer edges 30, 36. The first and second inner edges 28, 34 of each half are coupled to base 20, and the first and second outer edges 30, 36 of each half are coupled to surface 11A of the mating part 11.

Figure 5:
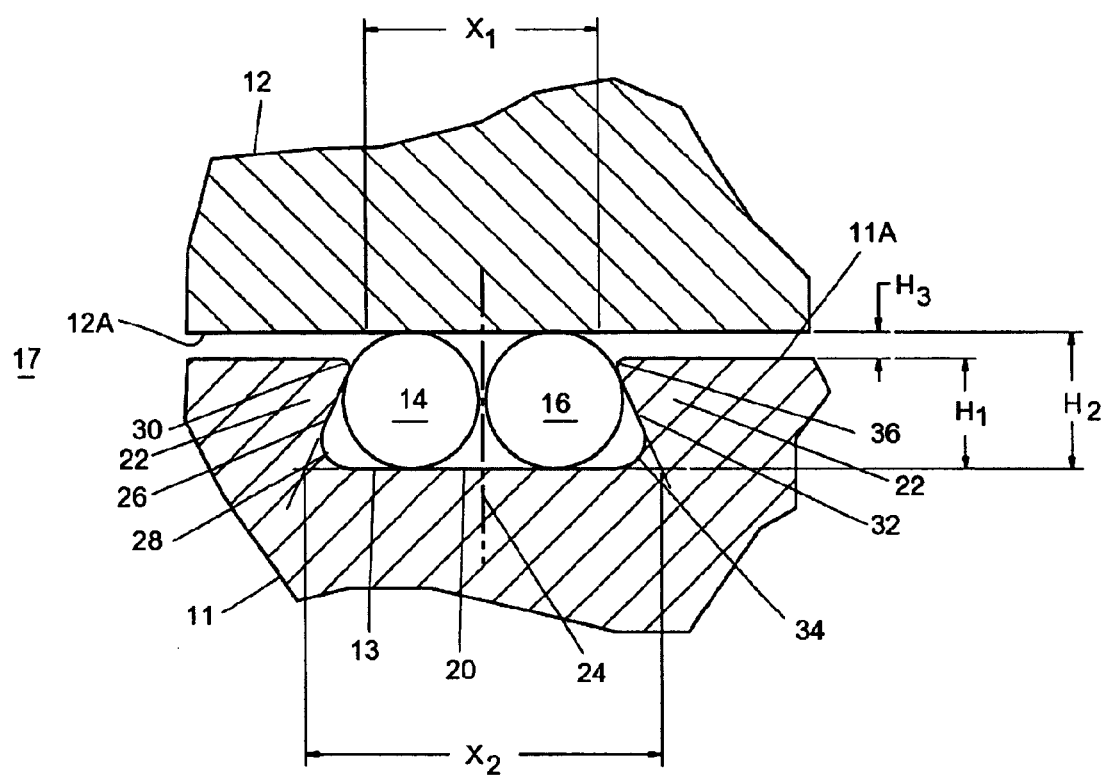
FIG. 5 is a cross-sectional view of the embodiment of FIG. 3.

With reference to FIG. 5, the distance from the first outer edge 30 of the first half of the groove to the second outer edge 36 of the second half of the groove along a radial axis is $X_1$. At the base 20, from the first inner edge 28 to the second inner edge 34 along a radial axis, the groove 13 has a width $X_2$. Typically, $X_1$ is less than $X_2$ for a dovetail cross-section. From the base 20 to the mating surface 11A, the groove 13 has a height $H_1$.

As will be discussed below, in the embodiment of FIG. 5, the groove 13 contains an o-ring 16 and a grounding gasket 14 either inside or outside and adjacent to the o-ring 16. When normally compressed, the total cross-sectional area of the o-ring and the grounding gasket will be between the values of $X_1$ and $X_2$. Each will be approximately $H_2$ in height, where $H_2$ is greater than or nearly equal to $H_1$. Therefore, the groove 13 will securely contain the o-ring 16 and the grounding gasket 14 while allowing each part to protrude out of the groove 13 where they contact the second mating part 12. Note that even when uncompressed, the invention anticipates that the groove will securely contain the o-ring 16 and the grounding gasket 14.

Since $H_2$ is greater than $H_1$, when the parts are mated, an infinitesimally small space is formed between the two mating parts having a height $H_3$, where $H_2-H_1=H_3$, and the distance $H_3$ approaches zero. The space to one side of the groove 13 is sealed from the space to an opposite side of the groove 13, and since the grounding gasket 14 is electrically coupled with the first and second mating parts 11, 12, the second mating part 12 is electrically coupled to the first mating part 11 with the aid of the grounding gasket 14.

An o-ring 16 is preferably substantially circular in the azimuthal direction centered about the first mating part 11. Thus, the o-ring 16 fits within and is retained by the groove 13. The cross-section of the o-ring 16 is preferably circular. Alternately, other non-circular cross-sections are possible.

The o-ring 16 is typically comprised of an elastomer material (e.g., fluorosilicone, nitrile, fluorocarbon, silicone, neoprene, ethylene propylene, etc.). These materials are generally selected per application based upon the following physical characteristics: resistance to fluid, hardness, toughness, tensile strength, elongation, o-ring compression force, modulus, tear resistance, abrasion resistance, volume change, compression set, thermal effects, resilience, deterioration, corrosion, permeability, coefficient of friction, coefficient of thermal expansion, outgas rates, etc.

A grounding gasket 14 is normally straight and can be conformed to fit into the groove 13. Alternately, an o-ring shape can be used. Preferably, the cross-section of the grounding gasket is circular. Alternately, other non-circular cross-sections are possible.

The grounding gasket 14 (e.g., a Spira Shield Quick-Shield commercially available from Spira Manufacturing Company) comprises an inner layer of a compressible material (e.g., fluorosilicone, neoprene, PVC cord, silicone, etc.) and an outer conductive layer (e.g. beryllium-copper or stainless steel plated with gold, tin, or tin-lead). The material serving as the inner layer of compressible material and the material serving as the outer conductive layer are generally selected per application using some of the physical characteristics described above.

Since the grounding gasket comprises a conductive outer layer, where the first and second parts are also conductive, the connection between the parts via the grounding gasket can form an electrical bridge.

As noted above, removing o-ring 16 from a conventional groove 13 required either the installation of groove reliefs or risking damage to the edges of the groove when prying the o-ring out of the groove. As a result of this invention both issues have been addressed. With reference to FIGS. 6A, 6B, and 7, when repairing or replacing component parts, the process of removing the o-ring 16 and the grounding gasket 14 is simplified, and requires that an end 14A, 14B be pulled out of the groove 13. This is made possible not only by the presence of an accessible end, but also by the fact that the grounding gasket, as noted above, has certain compressible properties which allow the grounding gasket to be manipulated.

With the grounding gasket removed, the o-ring 16 is exposed within the groove. As a result, removing the o-ring is achieved by pulling or pushing a particular section of the o-ring out of position.

A second embodiment of the present invention anticipates that a connection between two parts requires a seal capable of sealing a first region from a second region using two sealing elements, and providing access to a third region between the two sealing elements in order to facilitate leak checking the sealing elements. In an embodiment of the present invention, the first region comprises a first fluid, the second region comprises a second fluid, and the third region comprises a third fluid. By definition, the term fluid can refer to a material in either a liquid phase or a gaseous phase. For example, the first fluid can be a coolant such as Fluorinert, the second fluid can be a vacuum, and the third fluid can, in general, be air at atmospheric pressure, when not leak checking the seals, and a gas such as helium from a gas supplying member, when leak checking the seals.

Figure 8:
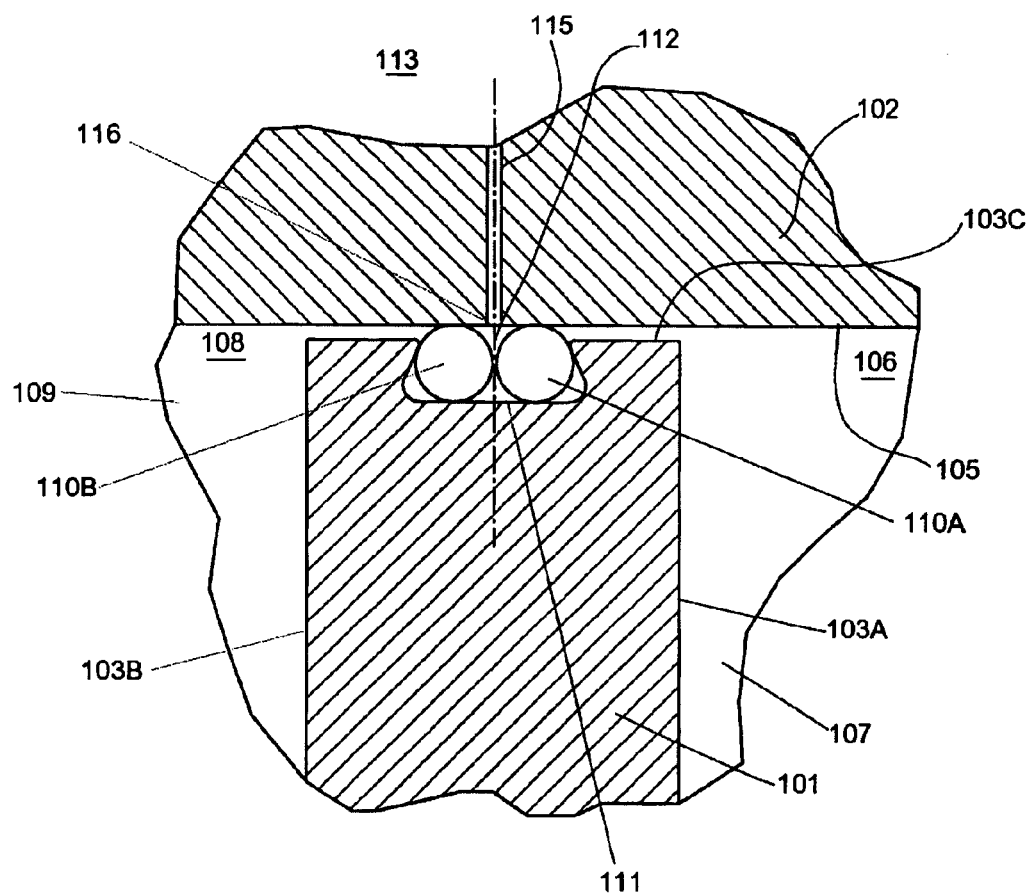
FIG. 8 is an enlarged cross-sectional view of a second preferred embodiment of the invention.

Thus, with reference to FIG. 8, a first element 101 having a first wall surface 103A, a second wall surface 103B, and a first mating surface 103C is attached in a known way to a second element 102 having a second mating surface 105. The first element 101 can, for example, separate a first fluid 106 in a first region 107 from a second fluid 108 in a second region 109 using two o-rings 110A and 110B secured within a single groove 111. Additionally, a third region 112 can be provided between the two o-rings 110A, 110B, and can be coupled to a third fluid 113 from a gas injection point 116 through a leak-check port 115. Methods of using leak check port 115 to check seal integrity and, if necessary, determine the location of a leak are well known to those skilled in the art of vacuum processing.

With continuing reference to FIG. 8, the groove 111 is shown containing first and second o-rings 110A and 110B. In accordance with this embodiment the structure of the groove and the o-rings are substantially the same in terms of their physical and structural properties as in FIGS. 4-7. That is, the groove 111 is just wide enough so as to secure both o-rings inside of it and high enough so as to allow them to protrude from the top of the groove. Therefore, when the o-rings are compressed during a connection between first and second members 101 and 102, a space is created through which the fluid can flow only up to the seals created by the o-rings.

Further, removal of the o-rings is possible by removing one o-ring and thereby exposing the other. For example, a groove relief (not shown) can be employed in the single groove 111 in order to permit easy removal of both o-rings 110A and 110B.

Numerous modifications and variations of the present invention are possible in light of the above teachings. It is therefore to be understood that, within the scope of the appended claims, the invention may be practiced otherwise than as specifically described herein.

I claim:

1. A sealing apparatus, comprising:
  a first part having a first surface configured to cooperate with a second surface of a second part;
  a groove formed in the first surface;
  a first o-ring, configured to seal a first fluid in a first region from a second fluid in a second region, while contained in the groove;
  a second o-ring in continuous contact with the first o-ring while contained in the groove thereby defining a third region between the first o-ring and second o-ring; and
  a leak check port in fluid communication with said third region and configured to check a fluid leak in at least one of said first o-ring and said second o-ring.

2. An apparatus according to claim 1, wherein the first surface is substantially flat except for the groove.

3. An apparatus according to claim 1, wherein the o-rings are substantially circular in the azimuthal direction.

4. An apparatus according to claim 1, wherein the o-rings comprise substantially circular cross-sections.

5. An apparatus according to claim 1, wherein the o-rings are made from a material selected from the group consisting of fluorosilicone, nitrile, fluorocarbon, silicone, neoprene, and ethylene propylene.

6. An apparatus according to claim 2, wherein the groove comprises a substantially dovetail shaped cross section.

7. An apparatus according to claim 6, wherein, when the o-rings are secured by the groove, portions of the o-rings protrude above the first surface.

8. An apparatus according to claim 1, wherein said leak check port having a gas injection point within said third region.

9. An apparatus according to claim 8, further comprising a gas supplying member connected to the gas injection point via the leak check port.

10. An apparatus according to claim 8, wherein the gas injection point is interposed between seals created by the first and second o-rings.

11. An apparatus according to claim 8, wherein the gas injection point comprises a hole located in the base of the groove.

12. An apparatus according to claim 8, wherein the gas injection point comprises a hole located in the mating surface of the second part.

13. A plasma processing chamber, comprising:
  a first part of the plasma processing chamber having a first surface;
  a second part of the plasma processing chamber having a second surface, wherein said first surface of the first part is configured to cooperate with the second surface of the second part;
  a groove formed in the first surface;
  an o-ring, configured to seal a first area between the first and second surfaces from a second area exterior to the first area, while contained in the groove; and
  a grounding gasket, configured to electrically couple the first and second surfaces, while contained in the groove adjacent the o-ring.

14. An apparatus according to claim 13, wherein the first part comprises conductive material.

15. An apparatus according to claim 13, wherein the first surface is substantially flat except for the groove.

16. An apparatus according to claim 13, wherein the o-ring is substantially circular in the azimuthal direction.

17. An apparatus according to claim 13, wherein the o-ring comprises a substantially circular cross-section.

18. An apparatus according to claim 13, wherein the o-ring is made from a material selected from the group consisting of fluorosilicotle, nitrile, fluorocarbon, silicone, neoprene, and ethylene propylene.

19. An apparatus according to claim 13, wherein the grounding gasket comprises a substantially circular cross section.

20. An apparatus according to claim 13, wherein the grounding gasket comprises Spira Shield Quick Shield.

21. An apparatus according to claim 13, wherein the groove comprises a substantially dovetail shaped cross section.

22. An apparatus according to claim 13, wherein, when the o-ring and the grounding gasket are secured within the groove, portions of the o-ring and the grounding gasket protrude above the first surface.

* * * * *